US006696537B2

(12) United States Patent
McConville et al.

(10) Patent No.: US 6,696,537 B2
(45) Date of Patent: Feb. 24, 2004

(54) METHOD OF POLYMERIZATION AND POLYMER PRODUCED THEREFROM

(75) Inventors: David H. McConville, Houston, TX (US); John F. Szul, Nitro, WV (US); Donald R. Loveday, Houston, TX (US)

(73) Assignee: Univation Technologies, LLC, Houston, TX (US)

( * ) Notice: Subject to any disclaimer, the term of this patent is extended or adjusted under 35 U.S.C. 154(b) by 47 days.

(21) Appl. No.: 10/147,216

(22) Filed: May 16, 2002

(65) Prior Publication Data

US 2002/0198351 A1 Dec. 26, 2002

Related U.S. Application Data

(62) Division of application No. 09/442,813, filed on Nov. 18, 1999, now Pat. No. 6,417,304.

(51) Int. Cl.[7] .................. C08F 10/02; C08F 210/04; C08F 4/44
(52) U.S. Cl. .................. 526/352; 526/161; 526/348.6; 502/152
(58) Field of Search .................. 526/352, 160, 526/348, 348.6, 161; 502/155

(56) References Cited

U.S. PATENT DOCUMENTS

| | | | | |
|---|---|---|---|---|
| 4,057,565 A | 11/1977 | Manzer | .................. | 260/429 |
| 5,426,243 A | 6/1995 | Lecouve | .................. | 568/737 |
| 5,637,660 A | 6/1997 | Nagy et al. | .................. | 526/160 |
| 5,648,439 A | * 7/1997 | Bergmeister et al. | .................. | 526/96 |
| 5,707,913 A | * 1/1998 | Schlund et al. | .................. | 502/102 |
| 5,726,115 A | 3/1998 | Horton et al. | .................. | 502/152 |
| 5,798,427 A | 8/1998 | Foster et al. | .................. | 526/352 |
| 5,889,128 A | 3/1999 | Schrock et al. | .................. | 526/107 |

FOREIGN PATENT DOCUMENTS

| | | |
|---|---|---|
| EP | 0197310 A2 A3 | 10/1986 |
| EP | 0241560 A1 | 10/1987 |
| EP | 0751142 A2 | 1/1997 |
| EP | 0816372 A2 | 1/1998 |
| EP | 0816384 A2 A3 | 1/1998 |
| EP | 0803520 B1 | 12/1998 |
| EP | 0890575 A1 | 1/1999 |
| EP | 0893454 A1 | 1/1999 |
| EP | 0 893 454 A1 * | 1/1999 |
| JP | 02-78663 | 3/1990 |
| JP | 08-081415 | 7/1996 |
| JP | 08-277307 | 10/1996 |
| JP | 10-7712 | 1/1998 |
| JP | 10-45904 | 2/1998 |
| WO | WO 91/12285 | 8/1991 |
| WO | WO 92/12162 | 7/1992 |
| WO | WO 94/21700 | 9/1994 |
| WO | WO 96/08498 | 3/1996 |
| WO | WO 97/42197 | 11/1997 |
| WO | WO 97/45434 | 12/1997 |
| WO | WO 97/48735 | 12/1997 |
| WO | WO 97/48736 | 12/1997 |
| WO | WO 98/27124 | 6/1998 |
| WO | WO 98/30569 | 7/1998 |
| WO | WO 98/30612 | 7/1998 |
| WO | WO 98/34964 | 8/1998 |
| WO | WO 98/37109 | 8/1998 |
| WO | WO 98/46651 | 10/1998 |
| WO | WO 98/55467 | 12/1998 |
| WO | WO 99/02472 | 1/1999 |
| WO | WO 99/02536 | 1/1999 |
| WO | WO 99/12981 | 3/1999 |

OTHER PUBLICATIONS

*Organometallics*, Bei et al., vol. 16, pp. 3282–3302 (1997).
*Organometallics*, Grubbs, vol. 17, pp. 3149–3151 (1998).
*Macromolecules*, Repo, vol. 30, pp. 171–175 (1997).
*Polyhedron*, Guerin et al., vol. 17 (5–6), pp. 917–923 (1998).
*Inorganic Chemistry*, Furhman/Kempe et al., vol. 35, pp. 6742–6745 (1996).
*Organometallics*, Guerin et al., vol. 15 (26), pp. 5586–5590 (1996).
*Organometallics*, Guerin et al., vol. 17 (23), pp. 5172–5177 (1998).
*Macromolecular Chemistry and Physics*, Silvestro et al., vol. 197, No, 10, pp. 3209–3228 (1996).
*Journal of Organometallic Chemistry*, Harkonen et al., vol. 519, No. 1, pp. 205–208 (1996).
*J. Chem. Soc. Dalton Trans.*, Cloke et al., pp. 25–30 (1995).
*Journal of Organometallic Chemistry*, Clark et al., vol. 501, pp. 333–340 (1995).
*J. Am. Chem. Soc.*, Baumann et al., vol. 119, pp. 3830–3831 (1997).
*J. Am. Chem. Soc.*, Scollard et al., vol. 118, pp. 10008–10009 (1996).
*Organometallics*, Horton et al., vol. 15, pp. 2672–2674 (1996).
*Organometallics*, Guerin et al., vol. 15, pp. 5085–5089 (1996).

\* cited by examiner

*Primary Examiner*—Robert Harlan
(74) *Attorney, Agent, or Firm*—Jaime Sher; Kevin M. Faulkner

(57) ABSTRACT

A polymer produced by a polymerization process, in the gas or slurry phase, with a liquid carrier comprising an activator and a metal catalyst compound comprising a group 3 to 14 metal atom bound to at least one anionic leaving group and also bound to at least two group 15 atoms, at least one of which is also bound to a group 15 or 16 atom through another group which may be a $C_1$ to $C_{20}$ hydrocarbon group, a heteroatom containing group, silicon, germanium, tin, lead, phosphorus, or a halogen, wherein the group 15 or 16 atom may also be bound to nothing or a hydrogen, a group 14 atom containing group, a halogen, or a heteroatom containing group, and wherein each of the two group 15 atoms are also bound to a cyclic group and may optionally be bound to hydrogen, a halogen, a heteroatom or a hydrocarbyl group, or a heteroatom containing group.

15 Claims, No Drawings

METHOD OF POLYMERIZATION AND POLYMER PRODUCED THEREFROM

CROSS-REFERENCE TO RELATED APPLICATIONS

The present application is a Divisional of U.S. application Ser. No. 09/442,813, filed Nov. 18, 1999, now issued as U.S. Pat. No. 6,417,304.

FIELD OF THE INVENTION

This invention relates to olefin polymerization catalysts containing a metal atom bound to at least two group 15 atoms fed in solution or slurry into a gas phase or slurry phase reactor to produce polyolefins and the polyolefins produced therefrom.

BACKGROUND OF THE INVENTION

Metallocene polymerization catalysts (i.e. transition metals, typically groups 4, 5 or 6, having at least one pi bonded ligand, preferably a cyclopentadienyl, indenyl or fluorenyl group) have recently been used to produce resins having a desirable product properties.

Furthermore, there is always a need in the art for a method to introduce catalysts into a gas or slurry phase reactor in such a way as to reduce fouling and/or increase activity. Catalysts used in the gas phase are typically supported because in the past liquid catalysts severely fouled the reactor. Some supported catalysts however have the disadvantages of reduced activity. Thus there is a need in the art of gas or slurry phase processes to find efficient, cost effective reduced fouling means to feed catalysts into a gas or slurry phase reactor. For more information on the disadvantages of using liquid catalysts in a gas phase reactor see the background sections of U.S. Pat. No. 5,317,036 and U.S. Pat. No. 5,693,727 which relates to introducing unsupported catalysts into a gas phase reactor.

Schrock et al in U.S. Pat. No. 5,889,128 discloses a process for the living polymerization of olefins in solution using initiators having a metal atom and a ligand having two group 15 atoms and a group 16 atom or three group 15 atoms. In particular, the solution phase polymerization of ethylene using {[NON]ZrMe}[MeB(C$_6$F$_5$)$_3$] or {[NON]ZrMe(PhNMe$_2$)]}[B(C$_6$F$_5$)$_4$] is disclosed in examples 9 and 10.

Mitsui Chemicals, Inc. in EP 0 893 454 A1 discloses transition metal amides combined with activators to polymerize olefins in the solution phase. EP 893 454 A1 discloses unsupported transition metal amide compounds used in combination with activators to polymerize olefins in the solution phase.

Ethylenebis(salicylideneiminato)zirconium dichloride combined with methyl alumoxane deposited on a support and unsupported versions were used to polymerize ethylene by Repo et al in Macromolecules 1997, 30, 171–175.

U.S. Ser. No. 09/312,878, filed May 17, 1999 discloses novel supported catalysts used in the gas or slurry phase to polymerize olefins.

SUMMARY OF THE INVENTION

This invention relates to a catalyst system comprising a liquid carrier, an activator and a metal catalyst compound comprising a group 3 to 14 metal atom bound to at least one anionic leaving group and also bound to at least two group 15 atoms, at least one of which is also bound to a group 15 or 16 atom through another group which may be a $C_1$ to $C_{20}$ hydrocarbon group, a heteroatom containing group, silicon, germanium, tin, lead, phosphorus, or a halogen, wherein the group 15 or 16 atom may also be bound to nothing or a hydrogen, a group 14 atom containing group, a halogen, or a heteroatom containing group, and wherein each of the two group 15 atoms are also bound to a cyclic group and may optionally be bound to hydrogen, a halogen, a heteroatom or a hydrocarbyl group, or a heteroatom containing group.

This invention relates to the gas or slurry phase polymerization of olefins using an olefin polymerization catalyst system comprising an activator, a liquid carrier and a transition metal compound as described below.

The activator is preferably an aluminum alkyl, an alumoxane, a modified alumoxane, a non-coordinating anion, a borane, a borate or a combination thereof.

The carrier is preferably an alkane.

DETAILED DESCRIPTION OF THE INVENTION

In a preferred embodiment the activator is combined with a compound represented by the formulae:

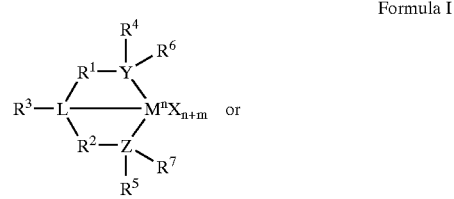

Formula I

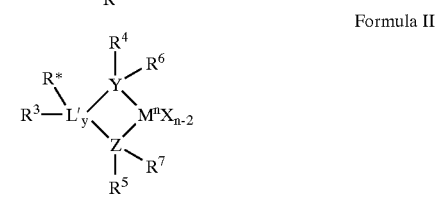

Formula II wherein

M is a Group 3 to 12 transition metal or a Group 13 or 14 main group metal, preferably a Group 4, 5, or 6 metal, and more preferably a Group 4 metal, and most preferably zirconium, titanium or hafnium, each X is independently a leaving group, preferably, an anionic leaving group, and more preferably hydrogen, a hydrocarbyl group, a heteroatom or a halogen, and most preferably an alkyl.

y is 0 or 1 (when y is 0 group L' is absent), n is the oxidation state of M, preferably +3, +4, or +5, and more preferably +4, m is the formal charge of the YZL or the YZL' ligand, preferably 0, −1, −2 or −3, and more preferably −2, L is a Group 15 or 16 element, preferably nitrogen, L' is a Group 15 or 16 element or Group 14 containing group, preferably carbon, silicon or germanium, Y is a Group 15 element, preferably nitrogen or phosphorus, and more preferably nitrogen, Z is a Group 15 element, preferably nitrogen or phosphorus, and more preferably nitrogen, $R^1$ and $R^2$ are independently a $C_1$ to $C_{20}$ hydrocarbon group, a heteroatom containing group having up to twenty carbon atoms, silicon, germanium, tin, lead, or phosphorus, preferably a $C_2$ to $C_{20}$ alkyl, aryl or aralkyl group, more preferably a linear, branched or cyclic $C_2$ to $C_{20}$ alkyl group, most preferably a $C_2$ to $C_6$ hydrocarbon group.

$R^3$ is absent or a hydrocarbon group, hydrogen, a halogen, a heteroatom containing group, preferably a linear, cyclic or branched alkyl group having 1 to 20 carbon atoms, more preferably $R^3$ is absent, hydrogen or an alkyl group, and most preferably hydrogen $R^4$ and $R^5$ are independently an alkyl group, an aryl group, substituted aryl group, a cyclic alkyl group, a substituted cyclic alkyl group, a cyclic aralkyl group, a substituted cyclic aralkyl group or multiple ring system, preferably having up to 20 carbon atoms, more preferably between 3 and 10 carbon atoms, and even more preferably a $C_1$ to $C_{20}$ hydrocarbon group, a $C_1$ to $C_{20}$ aryl group or a $C_1$ to $C_{20}$ aralkyl group, or a heteroatom containing group, for example $PR_3$, where R is an alkyl group, $R^1$ and $R^2$ may be interconnected to each other, and/or $R^4$ and $R^5$ may be interconnected to each other, $R^6$ and $R^7$ are independently absent, or hydrogen, an alkyl group, halogen, heteroatom or a hydrocarbyl group, preferably a linear, cyclic or branched alkyl group having 1 to 20 carbon atoms, more preferably absent, and R* is absent, or is hydrogen, a Group 14 atom containing group, a halogen, a heteroatom containing group.

By "formal charge of the YZL or YZL' ligand", it is meant the charge of the entire ligand absent the metal and the leaving groups X.

By "$R^1$ and $R^2$ may also be interconnected" it is meant that $R^1$ and $R^2$ may be directly bound to each other or may be bound to each other through other groups. By "$R^4$ and $R^5$ may also be interconnected" it is meant that $R^4$ and $R^5$ may be directly bound to each other or may be bound to each other through other groups.

An alkyl group may be a linear, branched alkyl radicals, or alkenyl radicals, alkynyl radicals, cycloalkyl radicals or aryl radicals, acyl radicals, aroyl radicals, alkoxy radicals, aryloxy radicals, alkylthio radicals, dialkylamino radicals, alkoxycarbonyl radicals, aryloxycarbonyl radicals, carbomoyl radicals, alkyl- or dialkyl-carbamoyl radicals, acyloxy radicals, acylamino radicals, aroylamino radicals, straight, branched or cyclic, alkylene radicals, or combination thereof. An aralkyl group is defined to be a substituted aryl group.

In a preferred embodiment, L is bound to one of Y or Z and one of $R^1$ or $R^2$ is bound to L and not to Y or Z.

In an alternate embodiment $R^3$ and L do not form a heterocyclic ring.

In a preferred embodiment $R^4$ and $R^5$ are independently a group represented by the following formula:

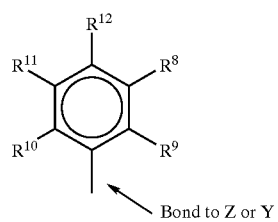

wherein
$R^8$ to $R^{12}$ are each independently hydrogen, a $C_1$ to $C_{40}$ alkyl group, a heteroatom, a heteroatom containing group containing up to 40 carbon atoms, preferably a $C_1$ to $C_{20}$ linear or branched alkyl group, preferably a methyl, ethyl, propyl or butyl group, any two R groups may form a cyclic group and/or a heterocyclic group. The cyclic groups may be aromatic. In a preferred embodiment $R^9$, $R^{10}$ and $R^{12}$ are independently a methyl, ethyl, propyl or butyl group, in a preferred embodiment $R^9$, $R^{10}$ and $R^{12}$ are methyl groups, and $R^8$ and $R^{11}$ are hydrogen.

In a particularly preferred embodiment $R^4$ and $R^5$ are both a group represented by the following formula:

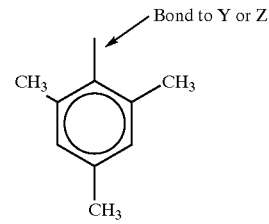

These metal compounds are prepared by methods known in the art, such as those disclosed in EP 0 893 454 A1 and U.S. Pat. No. 5,889,128 and the references cited therein which are all incorporated by reference herein. A preferred direct synthesis of these compounds comprises reacting the neutral ligand with $M^nX_n$ (M is a group 3–14 metal, n is the oxidation state of M, X is an anionic group, such as halide, in a non-coordinating or weakly coordinating solvent, such as ether, toluene, xylene, benzene, methylene chloride, and/or hexane or other solvent having a boiling point above 60° C., at about 20 to about 150° C. (preferably 20 to 100° C.), preferably for 24 hours or more, then treating the mixture with an excess (such as four equivalents) of an alkylating agent, such as methyl magnesium bromide in ether. The magnesium salts are removed by filtration, and the metal complex isolated by standard techniques.

In a preferred embodiment this invention relates to a method to prepare a metal compound comprising reacting a neutral ligand with a compound represented by the formula $M^nX_n$ (where M is a group 3–14 metal, n is the oxidation state of M, X is an anionic leaving group) in a non-coordinating or weakly coordinating solvent, at about 20° C. or above, preferably at about 20 to about 100° C., then treating the mixture with an excess of an alkylating agent, then recovering the metal complex. In a preferred embodiment the solvent has a boiling point above 60° C., such as ether, toluene, xylene, benzene, methylene chloride and/or hexane.

The transition metal compounds described herein are preferably combined with one or more activators to form an olefin polymerization catalyst system. Preferred activators include alkyl aluminum compounds (such as diethylaluminum chloride), alumoxanes, modified alumoxanes, non-coordinating anions, boranes, borates and the like. It is within the scope of this invention to use alumoxane or modified alumoxane as an activator, and/or to also use ionizing activators, neutral or ionic, such as tri (n-butyl) ammonium tetrakis (pentafluorophenyl) boron or a trisperfluorophenyl boron metalloid precursor which ionize the neutral metallocene compound. Other useful compounds include triphenyl boron, triethyl boron, tri-n-butyl ammonium tetraethylborate, triaryl borane and the like.

There are a variety of methods for preparing alumoxane and modified alumoxanes, non-limiting examples of which are described in U.S. Pat. Nos. 4,665,208, 4,952,540, 5,091,352, 5,206,199, 5,204,419, 4,874,734, 4,924,018, 4,908,463, 4,968,827, 5,308,815, 5,329,032, 5,248,801, 5,235,081, 5,157,137, 5,103,031, 5,391,793, 5,391,529, 5,693,838, 5,731,253, 5,041,584 and 5,731,451 and European publications EP-A-0 561 476, EP-B1-0 279 586 and EP-A-0 594-218, and PCT publication WO 94/10180, all of which are herein fully incorporated by reference.

Ionizing compounds may contain an active proton, or some other cation associated with but not coordinated to or only loosely coordinated to the remaining ion of the ionizing compound. Such compounds and the like are described in European publications EP-A-0 570 982, EP-A-0 520 732, EP-A-0 495 375, EP-A-0 426 637, EP-A-500 944, EP-A-0 277 003 and EP-A-0 277 004, and U.S. Pat. Nos. 5,153,157, 5,198,401, 5,066,741, 5,206,197, 5,241,025, 5,387,568, 5,384,299 and 5,502,124 and U.S. patent application Ser. No. 08/285,380, filed Aug. 3, 1994, all of which are herein fully incorporated by reference. Other activators include those described in PCT publication WO 98/07515 such as tris (2,2',2"-nonafluorobiphenyl) fluoroaluminate, which is fully incorporated herein by reference. Combinations of activators are also contemplated by the invention, for example, alumoxanes and ionizing activators in combinations, see for example, PCT publications WO 94/07928 and WO 95/14044 and U.S. Pat. Nos. 5,153,157 and 5,453,410 all of which are herein fully incorporated by reference. Also, methods of activation such as using radiation and the like are also contemplated as activators for the purposes of this invention.

In general the metal compound and the activator are combined in ratios of about 1000:1 to about 0.5:1. In a preferred embodiment the metal compound and the activator are combined in a ratio of about 300:1 to about 1:1, preferably about 10:1 to about 1:1, for boranes the ratio is preferably about 1:1 to about 10:1 and for alkyl aluminum compounds (such as diethylaluminum chloride combined with water) the ratio is preferably about 0.5:1 to about 10:1.

The metal compound and activator are introduced into a slurry or gas phase reactor in a liquid carrier, preferably in solution. The catalyst and the activator may be fed in separately or together and may be combined immediately before being placed in the reactor or may be contacted for longer periods before being placed in the reactor. Preferred liquid carriers include alkanes, preferably pentane, hexane, isopentane, toluene, cyclohexane, isopentane, heptane, octane, isohexane and the like. Particularly preferred carriers include hexane, pentane, isopentane and toluene.

The catalyst system, the metal compounds and or the activator are preferably introduced into the reactor in one or more solutions. In one embodiment a solution of the activated metal compounds in an alkane such as pentane, hexane, toluene, isopentane or the like is introduced into a gas phase or slurry phase reactor. In another embodiment the catalyst system or the components can be introduced into the reactor in a suspension or an emulsion. In one embodiment, the transition metal compound is contacted with the activator, such as modified methylalumoxane, in a solvent and just before the solution is fed into a gas or slurry phase reactor. In another embodiment a solution of the metal compound is combined with a solution of the activator, allowed to react for a period of time then introduced into the reactor. In a preferred embodiment, the catalyst and activator are allowed to reactor for at least 1 second, preferably at least 5 minutes even more preferably between 5 and 60 minutes, before being introduced into the reactor. The catalyst and activator are typically present at a concentration of 0.0001 to 0.200 mol/l in the solutions, preferably 0.001 to 0.05 mol/l, more preferably 0.005 to 0.025 mol/l.

In a preferred embodiment, the catalyst system consists of the transition metal compound (catalyst) and or the activator (cocatalyst) which are preferably introduced into the reactor in solution. Solutions of the metal compounds are prepared by taking the catalyst and dissolving it in any solvent such as an alkane, toluene, xylene, etc. The solvent may first be purified in order to remove any poisons which may affect the catalyst activity, including any trace water and/or oxygenated compounds. Purification of the solvent may be accomplished by using activated alumina and activated supported copper catalyst, for example. The catalyst is preferably completely dissolved into the solution to form a homogeneous solution. Both catalyst and the activator may be dissolved into the same solvent, if desired. Once the catalysts are in solution, they may be stored indefinitely until use.

For polymerization, it preferred that the catalyst is combined with an activator prior to injection into the reactor. Additionally, other solvents and reactants can be added to the catalyst solutions (on-line or off-line), to the activator (on-line or off-line), or to the activated catalyst or catalysts.

In a preferred embodiment the catalyst systems of this invention have a productivity of 10,000 grams of polymer per gram of catalyst per hour or more, Polymerization Process of the Invention:

The catalysts and catalyst systems described above are suitable for use in the polymerization process of the invention. The polymerization process of the invention includes a gas phase or slurry phase process or a combination thereof.

In an embodiment, this invention is directed toward the slurry or gas phase polymerization or copolymerization reactions involving the polymerization of one or more monomers having from 2 to 30 carbon atoms, preferably 2–12 carbon atoms, and more preferably 2 to 8 carbon atoms. The invention is particularly well suited to the copolymerization reactions involving the polymerization of one or more olefin monomers of ethylene, propylene, butene-1, pentene-1,4-methyl-pentene-1, hexene-1, octene-1, decene-1,3-methyl-pentene-1,3,5,5-trimethyl-hexene-1 and cyclic olefins or a combination thereof. Other monomers can include vinyl monomers, diolefins such as dienes, polyenes, norbornene, norbornadiene monomers. Preferably a copolymer of ethylene is produced, where the comonomer is at least one alpha-olefin having from 4 to 15 carbon atoms, preferably from 4 to 12 carbon atoms, more preferably from 4 to 8 carbon atoms and most preferably from 4 to 7 carbon atoms.

In another embodiment ethylene or propylene is polymerized with at least two different comonomers to form a terpolymer. The preferred comonomers are a combination of alpha-olefin monomers having 4 to 10 carbon atoms, more preferably 4 to 8 carbon atoms, optionally with at least one diene monomer. The preferred terpolymers include the combinations such as ethylene/butene-1/hexene-1, ethylene/propylene/butene-1, propylene/ethylene/hexene-1, ethylene/propylene/norbornene and the like.

In a particularly preferred embodiment the process of the invention relates to the polymerization of ethylene and at least one comonomer having from 3 to 8 carbon atoms, preferably 4 to 7 carbon atoms. Particularly preferred comonomers are butene-1, 4-methyl-pentene-1, hexene-1 and octene-1, the most preferred being hexene-1 and/or butene-1.

Typically in a gas phase polymerization process a continuous cycle is employed where in one part of the cycle of a reactor system, a cycling gas stream, otherwise known as a recycle stream or fluidizing medium, is heated in the reactor by the heat of polymerization. This heat is removed from the recycle composition in another part of the cycle by a cooling system external to the reactor. Generally, in a gas fluidized bed process for producing polymers, a gaseous stream containing one or more monomers is continuously cycled through a fluidized bed in the presence of a catalyst under reactive conditions. The gaseous stream is withdrawn from the fluidized bed and recycled back into the reactor. Simultaneously, polymer product is withdrawn from the reactor and fresh monomer is added to replace the polymerized monomer. (See for example U.S. Pat. Nos. 4,543,399, 4,588,790, 5,028,670, 5,317,036, 5,352,749, 5,405,922, 5,436,304, 5,453,471, 5,462,999, 5,616,661 and 5,668,228 all of which are fully incorporated herein by reference.)

The reactor pressure in a gas phase process may vary from about 10 psig (69 kPa) to about 500 psig (3448 kPa), preferably in the range of from about 100 psig (690 kPa) to about 400 psig (2759 kPa), preferably in the range of from about 200 psig (1379 kPa) to about 400 psig (2759 kPa), more preferably in the range of from about 250 psig (1724 kPa) to about 350 psig (2414 kPa).

The reactor temperature in the gas phase process may vary from about 30° C. to about 120° C., preferably from about 60° C. to about 115° C., more preferably in the range of from about 70° C. to 110° C., and most preferably in the range of from about 70° C. to about 95° C.

The productivity of the catalyst or catalyst system is influenced by the main monomer partial pressure. The preferred mole percent of the main monomer, ethylene or propylene, preferably ethylene, is from about 25 to 90 mole percent and the monomer partial pressure is in the range of from about 75 psia (517 kPa) to about 300 psia (2069 kPa), which are typical conditions in a gas phase polymerization process.

In a preferred embodiment, the reactor utilized in the present invention and the process of the invention produce greater than 500 lbs of polymer per hour (227 Kg/hr) to about 200,000 lbs/hr (90,900 Kg/hr) or higher of polymer, preferably greater than 1000 lbs/hr (455 Kg/hr), more preferably greater than 10,000 lbs/hr (4540 Kg/hr), even more preferably greater than 25,000 lbs/hr (11,300 Kg/hr), still more preferably greater than 35,000 lbs/hr (15,900 Kg/hr), still even more preferably greater than 50,000 lbs/hr (22,700 Kg/hr) and most preferably greater than 65,000 lbs/hr (29,000 Kg/hr) to greater than 100,000 lbs/hr (45,500 Kg/hr).

Other gas phase processes contemplated by the process of the invention include those described in U.S. Pat. Nos. 5,627,242, 5,665,818 and 5,677,375, and European publications EP-A-0 794 200, EP-A-0 802 202 and EP-B-634 421 all of which are herein fully incorporated by reference.

A slurry polymerization process generally uses pressures in the range of from about 1 to about 50 atmospheres and even greater and temperatures in the range of 0° C. to about 120° C. In a slurry polymerization, a suspension of solid, particulate polymer is formed in a liquid polymerization diluent medium to which ethylene and comonomers and often hydrogen along with catalyst are added. The suspension including diluent is intermittently or continuously removed from the reactor where the volatile components are separated from the polymer and recycled, optionally after a distillation, to the reactor. The liquid diluent employed in the polymerization medium is typically an alkane having from 3 to 7 carbon atoms, preferably a branched alkane. The medium employed should be liquid under the conditions of polymerization and relatively inert. When a propane medium is used the process must be operated above the reaction diluent critical temperature and pressure. Preferably, a hexane or an isobutane medium is employed.

In one embodiment, a preferred polymerization technique of the invention is referred to as a particle form polymerization, or a slurry process where the temperature is kept below the temperature at which the polymer goes into solution. Such technique is well known in the art, and described in for instance U.S. Pat. No. 3,248,179 which is fully incorporated herein by reference. The preferred temperature in the particle form process is within the range of about 185° F. (85° C.) to about 230° F. (110° C.). Two preferred polymerization methods for the slurry process are those employing a loop reactor and those utilizing a plurality of stirred reactors in series, parallel, or combinations thereof. Non-limiting examples of slurry processes include continuous loop or stirred tank processes. Also, other examples of slurry processes are described in U.S. Pat. No. 4,613,484, which is herein fully incorporated by reference.

In another embodiment, the slurry process is carried out continuously in a loop reactor. The catalyst, typically a slurry in isobutane or a solution in an alkane, is injected regularly to the reactor loop, which is itself filled with circulating slurry of growing polymer particles in a diluent of isobutane containing monomer and comonomer. Hydrogen, optionally, may be added as a molecular weight control. The reactor is maintained at pressure of about 525 psig to 625 psig (3620 kPa to 4309 kPa) and at a temperature in the range of about 140° F. to about 220° F. (about 60° C. to about 104° C.) depending on the desired polymer density. Reaction heat is removed through the loop wall since much of the reactor is in the form of a double-jacketed pipe. The slurry is allowed to exit the reactor at regular intervals or continuously to a heated low pressure flash vessel, rotary dryer and a nitrogen purge column in sequence for removal of the isobutane diluent and all unreacted monomer and comonomers. The resulting hydrocarbon free powder is then compounded for use in various applications.

In an embodiment the reactor used in the slurry process of the invention is capable of and the process of the invention is producing greater than 2000 lbs of polymer per hour (907 Kg/hr), more preferably greater than 5000 lbs/hr (2268 Kg/hr), and most preferably greater than 10,000 lbs/hr (4540 Kg/hr). In another embodiment the slurry reactor used in the process of the invention is producing greater than 15,000 lbs of polymer per hour (6804 Kg/hr), preferably greater than 25,000 lbs/hr (11,340 Kg/hr) to about 100,000 lbs/hr (45,500 Kg/hr).

In another embodiment in the slurry process of the invention the total reactor pressure is in the range of from 400 psig (2758 kPa) to 800 psig (5516 kPa), preferably 450 psig (3103 kPa) to about 700 psig (4827 kPa), more preferably 500 psig (3448 kPa) to about 650 psig (4482 kPa), most preferably from about 525 psig (3620 kPa) to 625 psig (4309 kPa).

In yet another embodiment in the slurry process of the invention the concentration of ethylene in the reactor liquid medium is in the range of from about 1 to 10 weight percent, preferably from about 2 to about 7 weight percent, more preferably from about 2.5 to about 6 weight percent, most preferably from about 3 to about 6 weight percent.

A preferred process of the invention is where the process, preferably a slurry or gas phase process is operated in the absence of or essentially free of any scavengers, such as triethylaluminum, trimethylaluminum, triisobutylaluminum and tri-n-hexylaluminum and diethyl aluminum chloride, dibutyl zinc and the like. This preferred process is described in PCT publication WO 96/08520 and U.S. Pat. No. 5,712,352, which are herein fully incorporated by reference.

In another preferred embodiment the one or all of the catalysts and/or activators are combined with up to 10 weight % of a metal stearate, (preferably a aluminum stearate, more preferably aluminum distearate) based upon the weight of the catalyst and the stearate, preferably 2 to 3 weight %. In an alternate embodiment a solution of the metal stearate is fed into the reactor. In another embodiment the metal stearate is mixed with the catalyst and fed into the reactor separately. These agents may be mixed with the catalyst or may be fed into the reactor in a solution with or without the catalyst system or its components. In a particularly preferred embodiment a slurry of the stearate in mineral oil is introduced into the reactor separately from the metal compounds and or the activators.

More information on using aluminum stearate type additives may be found in U.S. Ser. No. 09/113,261 filed Jul. 10, 1998, which is incorporated by reference herein.

The catalyst system of this invention has excellent operability over a wide range of reactor conditions and resin grades from 0.2 Flow Index to 3 Melt Index and 0.950 g/cc to 0.916 g/cc density. The catalyst system did not experience any resin agglomeration or sheeting in over 10 days of continuous pilot scale operation. This invention also has the benefit of little or no fouling. No sheets, chunks or rubble were observed during or after the polymerization process. There was no trace of polymer build-up on the inside of the reactor walls or in the recycle gas line. Also, there was no increase in the pressure drop across the heat exchanger, cycle gas compressor or gas distribution plate during the entire run.

In a preferred embodiment, the polyolefin recovered typically has a melt index as measured by ASTM D-1238, Condition E, at 190° C. of 3000 g/10 min or less, preferably 1000 g/10 min or less, more preferably 20 g/10 min or less, more preferably 10 g/1 0 min or less. In a preferred embodiment the polyolefin is ethylene homopolymer or copolymer. In a preferred embodiment for certain applications, such as films, molded article and the like a melt index of 100 g/10 min or less is preferred. For some films and molded article a melt index of 10 g/10 min or less is preferred. Polyethylene having a melt index of between 0.01 to 10 dg/min is preferably produced. In another preferred embodiment the polymer produced has a weight average molecular weight of 40,000 Daltons or more, preferably 60,000 or more, preferably 100,000 or more, preferably 120,000 or more, preferably 150,000 or more. For LLDPE cast grade films a weight average molecular weight of 40,000 or more is preferred while a weight average molecular weight of 60,000 or more is preferred for blown film grades.

In another embodiment the polymer produced herein has a composition distribution breadth index (CDBI) of 70 or more, preferably 75 or more even more preferably 80 or more. Composition distribution breadth index is a means of measuring the distribution of comonomer between polymer chains in a given sample. CDBI is measured according to the procedure in WO 93/03093, published Feb. 18, 1993, provided that fractions having a molecular weight below 10,000 Mn are ignored for the calculation.

In a preferred embodiment the catalyst system described above is used to make a polyolefins, preferably polyethylene having a density of between 0.88 and 0.970 g/cm$^3$ (as measured by ASTM 2839). In some embodiments, a density of 0.915 to 0.940 g/cm$^3$ would be preferred, in other embodiments densities of 0.930 to 0.960 g/cm$^3$ are preferred. In particular polyethylenes having a density of 0.910 to 0.965, preferably 0.915 to 0.960, preferably 0.920 to 0.955 can be produced. In some embodiments, a density of 0.915 to 0.940 g/cm$^3$ would be preferred, in other embodiments densities of 0.930 to 0.970 g/cm$^3$ are preferred.

In a particularly preferred embodiment the catalyst system described above is used to make a polyethylene having a density (as measured by ASTM D 1505) of 0.910 to 0.935 g/cm$^3$,(preferably 0.915 to 0.930 g/cm$^3$), and a melt index (as measured by ASTM D-1238, Condition E, at 190° C.) of 10 or less dg/min, (preferably 5 dg/min or less even more preferably 3 dg/min or less), giving a film having a haze (as measured by ASTM 1003-95, Condition A) of 10% or less (preferably 7% or less, even more preferably a 5% or less), and a 450 gloss (as measured by ASTM D 2457) of 60 or more, (preferably 75 or more, more preferably 80 or more). In an even more preferred embodiment, the polymer is formed into a film of 0.5 to 10 mil (13 to 250 µm) that has a dart impact (as measured by ASTM D 1709, Method A) of 150 g or more, preferably 200 g or more and an Elmendorf machine direction tear resistance (as measured by ASTM D 1922) of 100 g or more preferably 250 g or more, and an Elmendorf transverse direction tear (as measured by ASTM D 1922) of 500 g or more, preferably 600 g or more.

The polyolefins then can be made into films, molded articles, sheets, pipes, wire and cable coating and the like. The films may be formed by any of the conventional techniques known in the art including extrusion, co-extrusion, lamination, blowing and casting. The film may be obtained by the flat film or tubular process which may be followed by orientation in an uniaxial direction or in two mutually perpendicular directions in the plane of the film to the same or different extents. Orientation may be to the same extent in both directions or may be to different extents. Particularly preferred methods to form the polymers into films include extrusion or coextrusion on a blown or cast film line.

The films produced may further contain additives such as slip, antiblock, antioxidants, pigments, fillers, antifog, UV stabilizers, antistats, polymer processing aids, neutralizers, lubricants, surfactants, pigments, dyes and nucleating agents. Preferred additives include silicon dioxide, synthetic silica, titanium dioxide, polydimethylsiloxane, calcium carbonate, metal stearates, calcium stearate, zinc stearate, talc, $BaSO_4$, diatomaceous earth, wax, carbon black, flame retarding additives, low molecular weight resins, hydrocarbon resins, glass beads and the like. The additives may be present in the typically effective amounts well known in the art, such as 0.001 weight % to 10 weight %.

EXAMPLES

Mn and Mw were measured by gel permeation chromatography on a waters 150° C. GPC instrument equipped with differential refraction index detectors. The GPC columns were calibrated by running a series of molecular weight standards and the molecular weights were calculated using Mark Houwink coefficients for the polymer is question.

Density was measured according to ASTM D 1505.

CDBI (composition distribution breadth index) was measured according to the procedure in WO 93/03093, published Feb. 18, 1993, except that fractions having a molecular weight below 10,000 Mn were ignored for the calculation.

Melt Index (MI) $I_2$ and $I_{21}$ were measured according to ASTM D-1238, Condition E, at 190° C.

Melt Index Ratio (MIR) is the ratio of $I_{21}$ over $I_2$ as determined by ASTM D-1238.

Weight % comonomer was measured by proton NMR.

MWD=Mw/Mn 26 inch Dart Impact was measured according to ASTM D 1709, Method A.

Elmendorf Tear MD and TD was measured according to ASTM 1922.

MD and TD 1% Secant modulus were measured according to ASTM D 882.

MD and TD Ultimate Tensile Strength were measured according to ASTM D 882.

MD and TD Ultimate Elongation were measured according to ASTM D 412.

Haze was measured according to ASTM 1003-95, Condition A.

45° gloss was measured according to ASTM D 2457.

MD is Machine Direction, TD is Transverse Direction.

ESCORENE™ LL3002.32 is a linear low density ethylene-hexene copolymer produced in a single gas phase reactor using a Ziegler-Natta catalyst available from Exxon Chemical Company in Houston, Tex., having a density of 0.918 g/cc, an $I_2$ of 2 dg/min and having a CDBI (composition distribution breadth index) of less than 65.

EXCEED™ ECD 125 is a linear low density ethylene-hexene copolymer produced in a single gas phase reactor using a metallocene catalyst available from Exxon Chemical Company in Houston, Tex., having a density of about 0.91 g/cc, an MI of 1.5 g/10 min.

ESCORENE™ LL3001.63 is a linear low density ethylene-hexene copolymer produced in a single gas phase reactor using a Ziegler-Natta catalyst available from Exxon Chemical Company in Houston, Tex., having a density of 0.918 g/cc, an MI of 1.0 g/10 min.

EXCEED™350D60 is a linear low density ethylene-hexene copolymer produced in a single gas phase reactor using a metallocene catalyst available from Exxon Chemical Company in Houston, Tex., having a density of 0.918 g/cc, an MI of 1.0 g/10 min and.

"PPH" is pounds per hour. "mPPH" is millipounds per hour. "ppmw" is parts per million by weight.

Preparation of Catalyst A

Preparation of [(2,4,6-Me$_3$C$_6$H$_2$)NHCH$_2$CH$_2$]$_2$NH Ligand (pre-Compound I)

A 2 L one-armed Schlenk flask was charged with a magnetic stir bar, diethylenetriamine (23.450 g, 0.227 mol), 2-bromomesitylene (90.51 g, 0.455 mol), tris(dibenzylideneacetone)dipalladium (1.041 g, 1.14 mmol), racemic-2,2'-bis(diphenylphosphino)-1,1'-binaphthyl (racemic BINAP) (2.123 g, 3.41 mmol), sodium tert-butoxide (65.535 g, 0.682 mol), and toluene (800 mL) under dry, oxygen-free nitrogen. The reaction mixture was stirred and heated to 100° C. After 18 h the reaction was complete, as judged by proton NMR spectroscopy. All remaining manipulations can be performed in air. All solvent was removed under vacuum and the residues dissolved in diethyl ether (1 L). The ether was washed with water (3×250 mL) followed by saturated aqueous NaCl (180 g in 500 mL) and dried over magnesium sulfate (30 g). Removal of the ether in vacuo yielded a red oil which was dried at 70° C. for 12 h under vacuum (yield: 71.10 g, 92%). $^1$H NMR (C$_6$D$_6$) d 6.83 (s, 4), 3.39 (br s, 2), 2.86 (t, 4), 2.49 (t, 4), 2.27 (s, 12), 2.21 (s, 6), 0.68 (br s, 1).

Preparation of {[(2,4,6-Me$_3$C$_6$H$_2$)NCH$_2$CH$_2$]$_2$NH}Zr(CH$_2$Ph)$_2$ (Compound I)

A 500 mL round bottom flask was charged with a magnetic stir bar, tetrabenzyl zirconium (Boulder Scientific) (41.729 g, 91.56 mmol), and 300 mL of toluene under dry, oxygen-free nitrogen. Solid pre-compound I above (32.773 g, 96.52 mmol) was added with stirring over 1 minute (the desired compound precipitates). The volume of the slurry was reduced to 100 mL and 300 mL of pentane added with stirring. The solid yellow-orange product was collected by filtration and dried under vacuum (44.811 g, 80% yield). $^1$H NMR (C$_6$D$_6$) d 7.22–6.81 (m, 12), 5.90 (d, 2), 3.38 (m, 2), 3.11 (m, 2), 3.01 (m, 1), 2.49 (m, 4), 2.43 (s, 6), 2.41 (s, 6), 2.18 (s, 6), 1.89 (s, 2), 0.96 (s, 2).

Preparation of 1.5 wt % Catalyst A in Toluene Solution

Note: All procedures below were performed in a glove box.
1. Weighed out 100 grams of purified toluene into a 1 L Erlenmeyer flask equipped with a Teflon coated stir bar.
2. Added 7.28 grams of Tetrabenzyl Zirconium.
3. Placed solution on agitator and stirred for 5 minutes. All of the solids went into solution.
4. Added 5.42 grams of Compound I.
5. Added an additional 551 grams of purified toluene and allowed mixture to stir for 15 minutes. No solids remained in the solution.
6. Poured catalyst solution into a clean, purged 1-L Whitey sample cylinder, labeled, removed from glovebox and placed in holding area for operations.

Example 1

An ethylene hexene copolymer was produced in a 14-inch (35.6 cm) pilot plant scale gas phase reactor operating at 85° C. and 350 psig (2.4 MPa) total reactor pressure having a water cooled heat exchanger. Ethylene was fed to the reactor at a rate of about 40 pounds per hour (18 kg/hr), hexene was fed to the reactor at a rate of about 0.6 pounds per hour (0.3 kg/hr) and hydrogen was fed to the reactor at a rate of 5 mPPH. Nitrogen was fed to the reactor as a make-up gas at about 5–8 PPH. The production rate was about 27 PPH. The reactor was equipped with a plenum having about 1,900 PPH of recycle gas flow. (The plenum is a device used to create a particle lean zone in a fluidized bed gas-phase reactor. See U.S. Pat. No. 5,693,727.) A tapered catalyst injection nozzle having a 0.041 inch (0.11 cm) hole size was position in the plenum gas flow. A solution of 1 wt % Catalyst A in toluene and co-catalyst (MMAO-3A, 1 wt % Aluminum in hexane, (MMAO 3A is modified methyl alumoxane in heptane commercially available from Akzo Chemicals, Inc. under the trade name Modified Methylalumoxane type 3A, covered under patent number U.S. Pat. No. 5,041,584)) were mixed in line prior to passing through the injection nozzle into the fluidized bed. The MMAO and catalyst were controlled so that the Al:Zr molar ratio was 400:1. Nitrogen and isopentane were also fed to the injection nozzle as needed to maintain a stable average particle size. A unimodal polymer having nominal 0.28 dg/min ($I_{21}$) and 0.935 g/cc properties was obtained. A residual zirconium of 1.63 ppmw was calculated based on a reactor mass balance.

Example 2

An ethylene hexene copolymer was produced in a 14-inch (35.6 cm) pilot plant scale gas phase reactor operating at 85° C. and 350 psig (2.4 MPa) total reactor pressure having a water cooled heat exchanger. Ethylene was fed to the reactor at a rate of about 40 pounds per hour (18 kg/hr), hexene was fed to the reactor at a rate of about 3.5 pounds per hour (1.6 kg/hr) and hydrogen was fed to the reactor at a rate of 25 mPPH. Nitrogen was fed to the reactor as a make-up gas at about 5–8 PPH. The production rate was about 20 PPH. The reactor was equipped with a plenum having about 1,900 PPH of recycle gas flow. (The plenum is a device used to create a particle lean zone in a fluidized bed gas-phase reactor. See U.S. Pat. No. 5,693,727.) A tapered catalyst injection nozzle having a 0.041 inch (0.11 cm) hole size was position in the plenum gas flow. A solution of 1 wt % Catalyst A in toluene, 0.22 PPH of 1-hexene and co-catalyst (MMAO-3A, 4 wt % Aluminum in isopentane) were mixed in line prior to passing through the injection nozzle into the fluidized bed. MMAO and catalyst were controlled so that the Al:Zr molar ratio was 746:1. Nitrogen and isopentane were also fed to the injection nozzle as needed to maintain a stable average particle size. A unimodal polymer having nominal 1.2 dg/min ($I_2$), 29.7 dg/min ($I_{21}$), 23.9 $I_{21}/I_2$ ratio and 0.9165 g/cc properties was obtained. A residual zirconium of 0.89 ppmw was calculated based on a reactor mass balance.

Example 3

An ethylene hexene copolymer was produced in a 14-inch (35.6 cm) pilot plant scale gas phase reactor operating at 105° C. and 350 psig (2.4 MPa) total reactor pressure having a water cooled heat exchanger. Ethylene was fed to the reactor at a rate of about 40 pounds per hour (18 kg/hr), hexene was fed to the reactor at a rate of about 0.6 pounds per hour (0.3 kg/hr) and hydrogen was fed to the reactor at a rate of 6 mPPH. Nitrogen was fed to the reactor as a make-up gas at about 5–8 PPH. The production rate was about 24 PPH. The reactor was equipped with a plenum having about 1,600 PPH of recycle gas flow. (The plenum is a device used to create a particle lean zone in a fluidized bed gas-phase reactor. See U.S. Pat. No. 5,693,727.) A tapered catalyst injection nozzle having a 0.055 inch (0.14 cm) hole size was position in the plenum gas flow. A solution of 1.5 wt % Catalyst A in toluene, and cocatalyst (MMAO-3A, 1.8 wt % Aluminum in 25% heptane/75% hexane solution) were mixed in line prior to passing through the injection nozzle into the fluidized bed. MMAO and catalyst were controlled so that the Al:Zr molar ratio was 320:1. Nitrogen and isopentane were also fed to the injection nozzle as needed to maintain a stable average particle size. A unimodal polymer having nominal 0.67 dg/min ($I_{21}$) and 0.9358 g/cc properties was obtained. A residual zirconium of 2.33 ppmw was calculated based on a reactor mass balance.

Example 4

An ethylene hexene copolymer was produced in a 14-inch (35.6 cm) pilot plant scale gas phase reactor operating at 85° C. and 350 psig (2.4 MPa) total reactor pressure having a water cooled heat exchanger. Ethylene was fed to the reactor at a rate of about 36 pounds per hour (16.3 kg/hr), hexene was fed to the reactor at a rate of about 3.5 pounds per hour (1.6 kg/hr) and hydrogen was fed to the reactor at a rate of 28 mPPH. Nitrogen was fed to the reactor as a make-up gas at about 5–8 PPH. The production rate was about 18 PPH. The reactor was equipped with a plenum having about 1,900 PPH of recycle gas flow. (The plenum is a device used to create a particle lean zone in a fluidized bed gas-phase reactor. See U.S. Pat. No. 5,693,727.) A tapered catalyst injection nozzle having a 0.041 inch (0.11 cm) hole size was position in the plenum gas flow. A solution of 1 wt % Catalyst A in toluene, 0.22 PPH of 1-hexene and cocatalyst (MMAO-3A, 4 wt % Aluminum in isopentane) were mixed in line prior to passing through the injection nozzle into the fluidized bed. MMAO and catalyst were controlled so that the Al:Zr molar ratio was 925:1. Nitrogen and isopentane were also fed to the injection nozzle as needed to maintain a stable average particle size. A unimodal polymer having nominal 1.7 dg/min ($I_2$), 41.7 dg/min ($I_{21}$), 24.1 $I_{21}/I_2$ and 0.917 g/cc properties was obtained. A residual zirconium of 0.94 ppmw was calculated based on a reactor mass balance.

Example 5

An ethylene hexene copolymer was produced in a 14-inch (35.6 cm) pilot plant scale gas phase reactor operating at 85° C. and 350 psig (2.4 MPa) total reactor pressure having a water cooled heat exchanger. Ethylene was fed to the reactor at a rate of about 40 pounds per hour (18 kg/hr), hexene was fed to the reactor at a rate of about 0.6 pounds per hour (0.3 kg/hr) and hydrogen was fed to the reactor at a rate of 3.5 mPPH. Nitrogen was fed to the reactor as a make-up gas at about 5–8 PPH. The production rate was about 22 PPH. The reactor was equipped with a plenum having about 1,500 PPH of recycle gas flow. (The plenum is a device used to create a particle lean zone in a fluidized bed gas-phase reactor. See U.S. Pat. No. 5,693,727.) A tapered catalyst injection nozzle having a 0.041 inch (0.11 cm) hole size was position in the plenum gas flow. A solution of 1 wt % Catalyst A in toluene and cocatalyst (MMAO-3A, 1 wt % Aluminum in hexane) were mixed in line prior to passing through the injection nozzle into the fluidized bed. MMAO and catalyst were controlled so that the Al:Zr molar ratio was 450:1. Nitrogen and isopentane were also fed to the injection nozzle as needed to maintain a stable average particle size. A unimodal polymer having nominal 0.10 dg/min ($I_{21}$) and 0.931 g/cc properties was obtained. A residual zirconium of 1.36 ppmw was calculated based on a reactor mass balance.

Example 6

An ethylene hexene copolymer was produced in a 14-inch (35.6 cm) pilot plant scale gas phase reactor operating at 85° C. and 350 psig (2.4 MPa) total reactor pressure having a water cooled heat exchanger. Ethylene was fed to the reactor at a rate of about 40 pounds per hour (18 kg/hr), hexene was fed to the reactor at a rate of about 0.5 pounds per hour (0.23 kg/hr) and hydrogen was fed to the reactor at a rate of 4 mPPH. Nitrogen was fed to the reactor as a make-up gas at about 5–8 PPH. The production rate was about 20 PPH. The reactor was equipped with a plenum having about 2,050 PPH of recycle gas flow. (The plenum is a device used to create a particle lean zone in a fluidized bed gas-phase reactor. See U.S. Pat. No. 5,693,727.) A tapered catalyst injection nozzle having a 0.041 inch (0.11 cm) hole size was position in the plenum gas flow. A solution of 1 wt % Catalyst A in toluene and cocatalyst (MMAO-3A, 4 wt % Aluminum in isopentane) were mixed in line prior to passing through the injection nozzle into the fluidized bed. MMAO and catalyst were controlled so that the Al:Zr molar ratio was 1550:1. Nitrogen and isopentane were also fed to the injection nozzle as needed to maintain a stable average particle size. A unimodal polymer having nominal 0.36 dg/min ($I_{21}$) and 0.943 g/cc properties was obtained. A residual zirconium of 2.5 ppmw was calculated based on a reactor mass balance.

Example 7

An ethylene hexene copolymer was produced in a 14-inch (35.6 cm) pilot plant scale gas phase reactor operating at 85° C. and 350 psig (2.4 MPa) total reactor pressure having a water cooled heat exchanger. Ethylene was fed to the reactor at a rate of about 40 pounds per hour (18 kg/hr), hexene was fed to the reactor at a rate of about 0.6 pounds per hour (0.3 kg/hr) and hydrogen was fed to the reactor at a rate of 12 mPPH. Nitrogen was fed to the reactor as a make-up gas at about 5–8 PPH. The production rate was about 20 PPH. The reactor was equipped with a plenum having about 2,050 PPH of recycle gas flow. (The plenum is a device used to create a particle lean zone in a fluidized bed gas-phase reactor. See U.S. Pat. No. 5,693,727.) A tapered catalyst injection nozzle having a 0.041 inch (0.11 cm) hole size was position in the plenum gas flow. A solution of 1 wt % Catalyst A in toluene and cocatalyst (MMAO-3A, 4 wt %

Aluminum in isopentane) were mixed in line prior to passing through the injection nozzle into the fluidized bed. MMAO and catalyst were controlled so that the Al:Zr molar ratio was 868:1. Nitrogen and isopentane were also fed to the injection nozzle as needed to maintain a stable average particle size. A unimodal polymer having nominal 3.5 dg/min ($I_{21}$), 0.115 dg/min ($I_2$), 30.2 $I_{21}/I_2$ ratio and 0.949 g/cc properties was obtained. A residual zirconium of 2.5 ppmw was calculated based on a reactor mass balance.

Example 8

An ethylene hexene copolymer was produced in a 14-inch (35.6 cm) pilot plant scale gas phase reactor operating at 85° C. and 350 psig (2.4 MPa) total reactor pressure having a water cooled heat exchanger. Ethylene was fed to the reactor at a rate of about 40 pounds per hour (18 kg/hr), hexene was fed to the reactor at a rate of about 1.1 pounds per hour and hydrogen was fed to the reactor at a rate of 12 mPPH. Nitrogen was fed to the reactor as a make-up gas at about 5–8 PPH. The production rate was about 25 PPH. The reactor was equipped with a plenum having about 1,900 PPH of recycle gas flow. (The plenum is a device used to create a particle lean zone in a fluidized bed gas-phase reactor. See U.S. Pat. No. 5,693,727.) A tapered catalyst injection nozzle having a 0.041 inch (0.11 cm) hole size was position in the plenum gas flow. A solution of 1 wt % Catalyst A in toluene and cocatalyst (MMAO-3A, 4 wt % Aluminum in isopentane) were mixed in line prior to passing through the injection nozzle into the fluidized bed. MMAO and catalyst were controlled so that the Al:Zr molar ratio was 842:1. Nitrogen and isopentane were also fed to the injection nozzle as needed to maintain a stable average particle size. A unimodal polymer having nominal 41.2 dg/min ($I_{21}$), 1.22 dg/min ($I_2$), 33.8 $I_{21}/I_2$ ratio and 0.940 g/cc properties was obtained. A residual zirconium of 2.77 ppmw was calculated based on a reactor mass balance.

Example 9

An ethylene hexene copolymer was produced in a 14-inch (35.6 cm) pilot plant scale gas phase reactor operating at 90° C. and 350 psig (2.4 MPa) total reactor pressure having a water cooled heat exchanger. Ethylene was fed to the reactor at a rate of about 48 pounds per hour, hexene was fed to the reactor at a rate of about 0.6 pounds per hour (0.3 kg/hr) and hydrogen was fed to the reactor at a rate of 10 mPPH. Nitrogen was fed to the reactor as a make-up gas at about 5–8 PPH. The production rate was about 23 PPH. The reactor was equipped with a plenum having about 1,600 PPH of recycle gas flow. (The plenum is a device used to create a particle lean zone in a fluidized bed gas-phase reactor. See U.S. Pat. No. 5,693,727.) A tapered catalyst injection nozzle having a 0.055 inch (1.4 cm) hole size was position in the plenum gas flow. A solution of 1.5 wt % Catalyst A in toluene, and cocatalyst (MMAO-3A, 1.8 wt % Aluminum in 25%heptane/75%hexane) were mixed in line prior to passing through the injection nozzle into the fluidized bed. MMAO and catalyst were controlled so that the Al:Zr molar ratio was 265:1. Nitrogen and isopentane were also fed to the injection nozzle as needed to maintain a stable average particle size. A unimodal polymer having nominal 0.3 dg/min ($I_{21}$) and 0.933 g/cc properties was obtained. A residual zirconium of 2.38 ppmw was calculated based on a reactor mass balance.

Example 10

An ethylene hexene copolymer was produced in a 14-inch (35.6 cm) pilot plant scale gas phase reactor operating at 95° C. and 350 psig (2.4 MPa) total reactor pressure having a water cooled heat exchanger. Ethylene was fed to the reactor at a rate of about 45 pounds per hour, hexene was fed to the reactor at a rate of about 0.6 pounds per hour (0.3 kg/hr) and hydrogen was fed to the reactor at a rate of 6 mPPH. Nitrogen was fed to the reactor as a make-up gas at about 5–8 PPH. The production rate was about 25 PPH. The reactor was equipped with a plenum having about 1,600 PPH of recycle gas flow. (The plenum is a device used to create a particle lean zone in a fluidized bed gas-phase reactor. See U.S. Pat. No. 5,693,727.) A tapered catalyst injection nozzle having a 0.055 inch (1.4 cm) hole size was position in the plenum gas flow. A solution of 1.5 wt % Catalyst A in toluene, and cocatalyst (MMAO-3A, 1.8 wt % Aluminum in 25% heptane/75% hexane) were mixed in line prior to passing through the injection nozzle into the fluidized bed. MMAO and catalyst were controlled so that the Al:Zr molar ratio was 350:1. Nitrogen and isopentane were also fed to the injection nozzle as needed to maintain a stable average particle size. A unimodal polymer having nominal 0.4 dg/min ($I_{21}$) and 0.934 g/cc properties was obtained. A residual zirconium of 2.27 ppmw was calculated based on a reactor mass balance.

The data for examples 1–10 are summarized in Table 1.

TABLE 1

| EXAMPLE | Temp. ° C. | $H_2/C_2$ | $C_6/C_2$ | $I_2$ dg/min | $I_{21}$ dg/min | Density g/cc | Residual Zr ppmw |
|---|---|---|---|---|---|---|---|
| 1 | 85 | 0.0015 | 0.0043 | n/a | 0.28 | 0.935 | 1.63 |
| 2 | 85 | 0.008 | 0.0410 | 1.2 | 29.7 | 0.9165 | 0.89 |
| 3 | 105 | 0.0015 | 0.0050 | n/a | 0.67 | 0.9358 | 2.33 |
| 4 | 85 | 0.0087 | 0.0405 | 1.7 | 41.7 | 0.917 | 0.94 |
| 5 | 85 | 0.0006 | 0.0051 | n/a | 0.1 | 0.931 | 1.36 |
| 6 | 85 | 0.0023 | 0.0012 | n/a | 0.36 | 0.943 | 2.50 |
| 7 | 85 | 00051 | 0.0013 | 0.115 | 3.5 | 0.949 | 2.50 |
| 8 | 85 | 0.0114 | 0.0154 | 1.22 | 41.2 | 0.940 | 2.77 |
| 9 | 90 | 0.0015 | 0.0050 | n/a | 0.3 | 0.933 | 2.38 |
| 10 | 95 | 0.0015 | 0.0050 | n/a | 0.4 | 0.934 | 2.27 |

Example 11

300 pounds (138 kg) of polyethylene produced according to example 4 above (referred to as Polymer A) was compounded on a Werner-Fleiderer ZSK-30 twin screw extruder with 1000 ppm Irganox™ 1076 and 1500 ppm Irgafos™ 1068 at a melt temperature of 200° C. and formed into pellets. Then the pellets were blown into a 1.0 mil (25 μm) film on an Gloucester blown film extrusion line at 188 lb/hr (85 kg/hr) rate, at 390° F. (199° C.) melt temperature, 24 inch (61 cm) frostline height, 2.5 blow-up ratio, and 60 mil (1524 μm) die gap. ESCORENE™ HD7755.10 (a conventional series reactor product of Exxon Chemical Company in Mt. Belvue Tex.) was run at the same conditions as a comparison. All films were conditioned according to 23° C., 50% humidity for 40 hours. The data are presented in Tables 2 and 3.

TABLE 2

| Example | Escorene™ LL3002.32 | Polymer A 1.8 g/10 min MI | Escorene™ LL3001.63 |
|---|---|---|---|
| $I_2$, g/10 min | 2 | 1076 | 1 |
| $I_{21}/I_2$ | 29 | 24 | 27 |
| Pellet density g/cc | 0.918 | 0.918 | 0.918 |

TABLE 2-continued

| Example | Escorene ™ LL3002.32 | Polymer A 1.8 g/10 min MI | Escorene ™ LL3001.63 |
|---|---|---|---|
| Head Pressure psi (MPa) | 2690 (19) | 2470 (17) | 3380 (23) |
| Motor load, % | 43 | 31.2 | 50.4 |
| Film gage mil, ($\mu$m) | 1 (25) | 1 (25) | 1 (25) |
| Film Density, g/cc | 0.917 | 0.916 | 0.917 |
| 26 inch (66 cm) Dart, g | 136 | 168 | 149 |
| Elm. Tear g/mil (g/$\mu$m) MD | 310(12.7) | 254(10.4) | 223(9.1) |
| Elm. Tear g/mil (g/$\mu$m) TD | 609(24.9) | 630(25.7) | 753(30.7) |
| 1% Secant Mod. psi (MPa) MD | 30430 (210) | 31580 (218) | 31320 (216) |
| 1% Secant Mod. psi (MPa) TD | 38950 (269) | 42120 (2902) | 39750 (274) |
| Ult. Tensile Str. psi (MPa) MD | 7444 (51) | 8551 (59) | 8880 (61) |
| Ult. Tensile Str. psi (MPa) TD | 6498 (45) | 9892 (68) | 6894 (48) |
| Ultimate Elongation % MD | 641 | 546 | 552 |
| Ultimate Elongation % TD | 793 | 694 | 756 |
| 45° gloss | 40 | 79 | 23 |
| Haze % | 22 | 4.4 | 20 |

TABLE 3

| Example | Polymer A 1.3 MI | EXCEED ™ 350D60 |
|---|---|---|
| $I_2$, g/10 min | 1.35 | 1 |
| $I_{21}/I_2$ | 23 | 16 |
| Pellet density g/cc | 0.918 | 0.918 |
| Head Pressure psi (MPa) | 3010 (21) | 3810 (26) |
| Motor load, % | 37.2 | 56.7 |
| Film gage mil, ($\mu$m) | 1 (25) | 1 (25) |
| Film Density, g/cc | 0.916 | 0.916 |
| 26 inch (66 cm) Dart, g | 276 | 646 |
| Elm. Tear g/mil (g/$\mu$m) MD | 219? | 264? |
| Elm. Tear g/mil (g/$\mu$m) TD | 616? | 392? |
| 1% Secant Mod. psi (MPa) MD | 31100 (214) | 29040 (200) |
| 1% Secant Mod. psi (MPa) TD | 41470 (286) | 33050 (228) |
| Ult. Tensile Str. psi (Mpa) MD | 9017 (62) | 9986 (69) |
| Ult. Tensile Str. psi (MPa) TD | 7684 (53) | 8535 (59) |
| Ultimate Elongation % MD | 529 | 504 |
| Ultimate Elongation % TD | 690 | 646 |
| 45° gloss | 74 | 25 |
| Haze % | 5 | 23 | na = not available

All documents described herein are incorporated by reference herein, including any priority documents and/or testing procedures. As is apparent form the foregoing general description and the specific embodiments, while forms of the invention have been illustrated and described, various modifications can be made without departing from the spirit and scope of the invention. Accordingly it is not intended that the invention be limited thereby.

What is claimed is:

1. A composition comprising polyethylene having a density of 0.910 g/cc to 0.935 g/cc, a melt index of 10 dg/min or less, and a melt index ratio of from 23.9 to 33.8; wherein a film made from the composition possesses a haze of 10% or less, and a 45° gloss of 60 units or more.

2. The composition of claim 1 wherein the polyethylene a density of 0.915–0.930 g/cc.

3. The composition of claim 1 wherein the polyethylene a melt index of 5 dg/min or less.

4. The composition of claim 1 wherein the polyethylene has a melt index of 3 dg/min or less.

5. The composition of claim 1 wherein a film made from the composition possesses a haze of 7% or less.

6. The composition of claim 1 wherein a film made from the composition possesses a haze of 5% or less.

7. The composition of claim 1 wherein a film made from the composition possesses a 45° gloss of 75 units or more.

8. The composition of claim 1 wherein a film made from the composition possesses a 45° gloss of 80 units or more.

9. The composition of claim 1 wherein a 25 $\mu$m -thickness film made from the composition possesses a dart impact of 150 g or more (as measured by ASTM D 1709 Method A) and an Elmendorf tear of 100 g or more in the machine direction and an Elmendorf tear of 500 g or more in the transverse direction.

10. The composition of claim 1 wherein a 25 $\mu$m -thickness film made from the composition possesses a dart impact of 100 g or more (as measured by ASTM 1709, Method A).

11. The composition of claim 1 wherein a 25 $\mu$m -thickness film made from the composition possesses an Elmendorf tear of 100 g or more in the machine direction.

12. The composition of claim 1 wherein a 25 $\mu$m -thickness film made from the composition possesses an Elmendorf tear of 500 g or more in the transverse direction.

13. The composition of claim 1, wherein the composition is a copolymer of ethylene derived units and 1-butene derived units or 1-hexene derived units.

14. The composition of claim 1, wherein the composition is produced in a gas phase polymerization reactor at a temperature of from 70 to 110° C.

15. The composition of claim 14, wherein a catalyst compound and activator are injected into the reactor in a liquid carrier; the catalyst compound represented by the following:

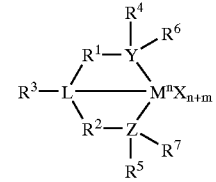

wherein
M is a Group 4, 5 or 6 metal;
each K is independently an anionic leaving group;
n is the oxidation state of M;
m is the formal charge of the YZL ligand;
L is a Group 15 or 16 element;
Y is a Group 15 element;
Z is a Group 15 element;
$R^1$ and $R^2$ are independently a $C_1$ to $C_{20}$ hydrocarbon group, a heteroatom containing group having up to twenty carbon atoms, the heteroatom being silicon, germanium, tin, lead, or phosphorus;
$R^3$ is absent or a hydrocarbon group, hydrogen, a halogen, a heteroatom containing group;
$R^4$ and $R^5$ are independently an alkyl group, an aryl group, substitute aryl group, a cyclic alkyl group, a substituted cyclic alkyl group, a cyclic arylalkyl group, a substituted cyclic arylalkyl group or multiple ring system; and
$R^6$ and $R^7$ are independently absent, or hydrogen, an alkyl group, halogen, heteroatom or a hydrocarbyl group.

* * * * *